(12) United States Patent
Barry et al.

(10) Patent No.: US 7,471,403 B2
(45) Date of Patent: Dec. 30, 2008

(54) APPARATUS AND METHODS FOR SELECTIVELY DISTRIBUTING PRINT PAGES IN MULTIPLE PRINT ENGINE SYSTEMS

(75) Inventors: Michael W. Barry, Duluth, GA (US); Francis A. Rowe, Duluth, GA (US); E. Neal Tompkins, Atlanta, GA (US)

(73) Assignee: Electronics for Imaging, Inc., Foster City, CA (US)

( * ) Notice: Subject to any disclaimer, the term of this patent is extended or adjusted under 35 U.S.C. 154(b) by 213 days.

(21) Appl. No.: 11/464,621

(22) Filed: Aug. 15, 2006

(65) Prior Publication Data

US 2006/0274350 A1 Dec. 7, 2006

Related U.S. Application Data

(63) Continuation of application No. 10/652,577, filed on Aug. 29, 2003, now Pat. No. 7,095,528, which is a continuation of application No. 08/511,641, filed on Aug. 7, 1995, now Pat. No. 6,657,741.

(51) Int. Cl.
G06F 15/00 (2006.01)
G06F 3/12 (2006.01)
(52) U.S. Cl. .................................. 358/1.13; 358/1.15
(58) Field of Classification Search .................. 358/1.1, 358/1.8, 1.9, 1.13, 1.15, 1.18, 402, 448; 709/201, 709/203, 213, 240
See application file for complete search history.

(56) References Cited

U.S. PATENT DOCUMENTS

| | | | |
|---|---|---|---|
| 4,754,428 A | 6/1988 | Schultz et al. | |
| 4,791,492 A | 12/1988 | Nagashima et al. | |
| 4,809,216 A | 2/1989 | Lai | |
| 5,040,031 A | 8/1991 | Hayashi | |
| 5,119,473 A | 6/1992 | Ikenoue | |
| 5,124,809 A | 6/1992 | Koishikawa | |
| 5,179,637 A * | 1/1993 | Nardozzi .................... 358/1.15 |
| 5,208,640 A | 5/1993 | Horie et al. | |
| 5,220,674 A | 6/1993 | Morgan et al. | |
| 5,287,194 A | 2/1994 | Lobiondo | |
| 5,303,336 A | 4/1994 | Kageyama et al. | |
| 5,315,701 A | 5/1994 | DiNicola et al. | |

(Continued)

FOREIGN PATENT DOCUMENTS

| EP | 0545261 A1 | 6/1993 |
|---|---|---|
| EP | 0550158 A1 | 7/1993 |
| EP | 0556994 A1 | 8/1993 |
| EP | 0601304 A1 | 6/1994 |
| EP | 0603714 A1 | 6/1994 |

OTHER PUBLICATIONS

Wayner, Peter, Print Pages Faster, Dec. 1993, Byte Magazine 115-116 and 119-123.
IBM Technical Disclosure Bulletin, vol. 35, No. 4A, pp. 79, 84 and 92, Sep. 1992.

*Primary Examiner*—Gabriel I Garcia
(74) *Attorney, Agent, or Firm*—Michael A. Glenn; Glenn Patent Group

(57) ABSTRACT

A multiple print engine configuration allows a plurality of workstations to create individual print jobs and then transfer them to a distributing processor. The distributing processor spools the jobs in a print spooler and then performs a software raster image processing ("RIP") operation on the print jobs. The RIP operation divides the jobs into multiple individual jobs which are stored in a page buffer. An image task manager in conjunction with an engine manager selectively s the RIPed pages to multiple print engines.

17 Claims, 4 Drawing Sheets

U.S. PATENT DOCUMENTS

| | | | |
|---|---|---|---|
| 5,319,464 A | 6/1994 | Douglas et al. | |
| 5,333,246 A | 7/1994 | Nagasaka | |
| 5,367,673 A | 11/1994 | Goldsmith et al. | |
| 5,392,391 A | 2/1995 | Caulk, Jr. et al. | |
| 5,402,527 A * | 3/1995 | Bigby et al. | 358/1.1 |
| 5,408,590 A | 4/1995 | Dvorzsak | |
| 5,428,464 A | 6/1995 | Silverbrook | |
| 5,435,544 A | 7/1995 | Mandel | |
| 5,448,655 A | 9/1995 | Yamaguchi | |
| 5,450,571 A | 9/1995 | Rosekrans et al. | |
| 5,467,434 A | 11/1995 | Hower, Jr. et al. | |
| 5,471,563 A | 11/1995 | Dennis et al. | |
| 5,528,374 A | 6/1996 | Matias | |
| 5,550,957 A | 8/1996 | Davidson, Jr. et al. | |
| 5,559,933 A | 9/1996 | Boswell | |
| 5,564,109 A | 10/1996 | Snyder et al. | |
| 5,580,177 A | 12/1996 | Gase et al. | |
| 5,590,245 A | 12/1996 | Leamy et al. | |
| 5,596,416 A | 1/1997 | Barry et al. | |
| 5,796,930 A | 8/1998 | Gauthier et al. | |
| 5,833,375 A | 11/1998 | Gauthier et al. | |
| 5,845,057 A | 12/1998 | Takeda | |
| 5,859,711 A | 1/1999 | Barry et al. | |
| 5,859,956 A | 1/1999 | Sugiyama et al. | |
| 5,883,724 A | 3/1999 | Yamada | |
| 6,009,804 A | 1/2000 | Yamada | |
| 6,035,103 A | 3/2000 | Zuber | |
| 6,168,145 B1 | 1/2001 | Tanaka et al. | |
| 6,325,368 B1 | 12/2001 | Ikeda et al. | |
| 6,327,043 B1 | 12/2001 | Rumph et al. | |
| 6,327,050 B1 | 12/2001 | Motamed et al. | |
| 6,452,692 B1 | 9/2002 | Yacoub | |
| 6,606,165 B1 | 8/2003 | Barry et al. | |
| 6,657,741 B1 | 12/2003 | Barry et al. | |

* cited by examiner

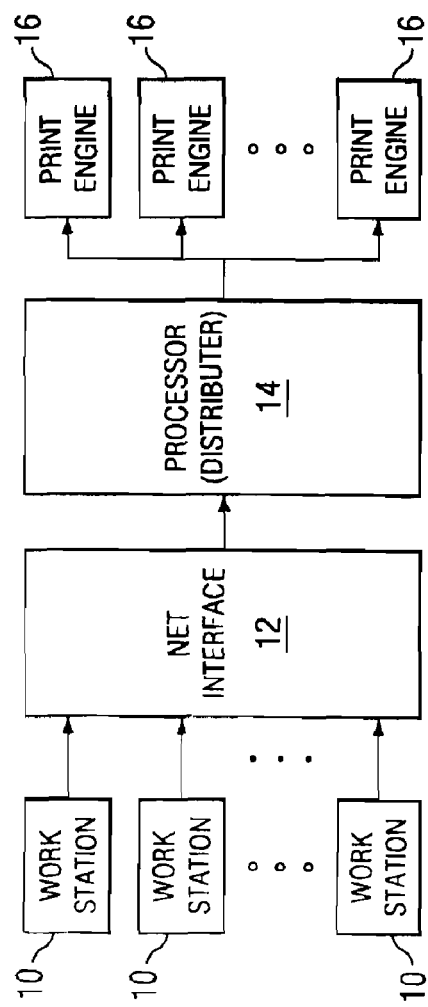
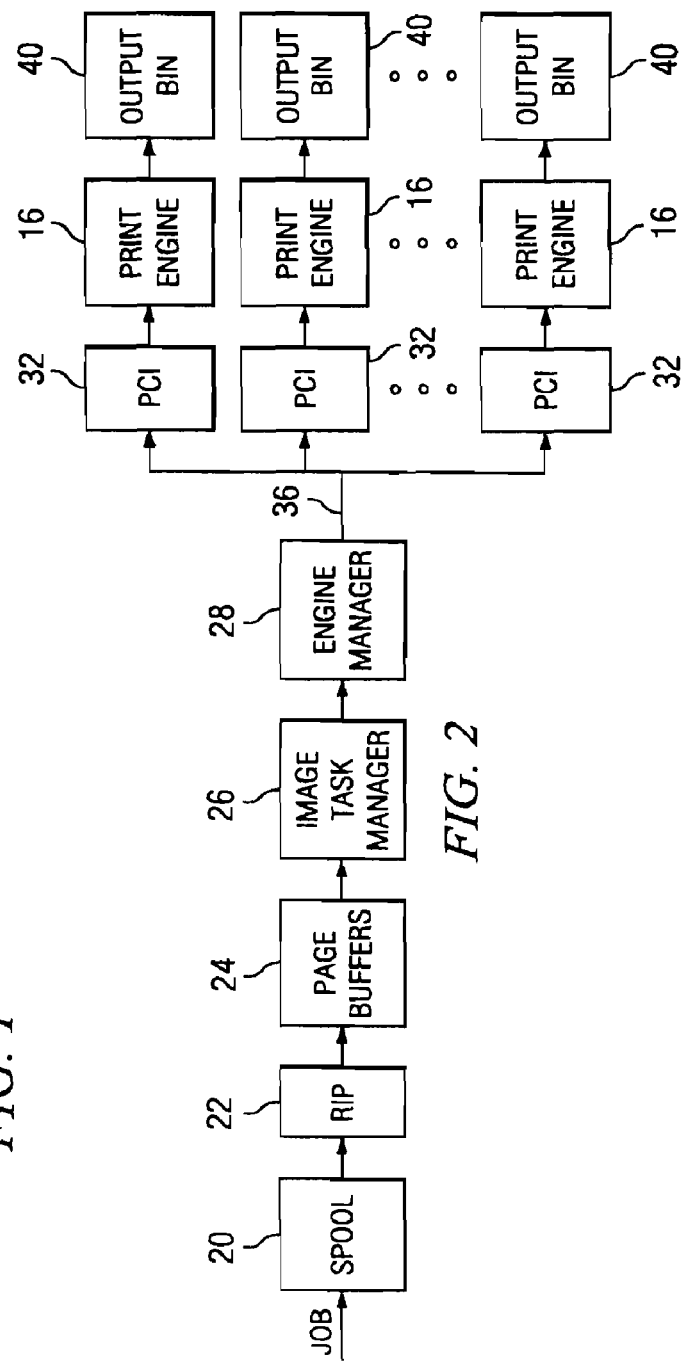

APPARATUS AND METHODS FOR SELECTIVELY DISTRIBUTING PRINT PAGES IN MULTIPLE PRINT ENGINE SYSTEMS

REFERENCE TO RELATED APPLICATIONS

The present application is a Continuation of U.S. patent application Ser. No. 10/652,577, now U.S. Pat. No. 7,095,528, which is a Continuation of U.S. patent application Ser. No. 08/511,641, now U.S. Pat. No. 6,657,741.

BACKGROUND

Electrophotographic print engines have been utilized with both printers and copiers. In a printer, the print engine typically interfaces with a computer to select and organize fonts or bit map the images. In a copier, the print engine interfaces with an input device that scans the image onto the photoconductor drum of the print engine. However, a CCD device could also be utilized in this application in the form of a CCD scanner. In either application, a conventional print engine for a monochrome process would typically feed a single sheet of paper and pass it by the photoconductor drum for an image transfer process and then pass it to a fuser. Thereafter, the completed sheet will be output. Multiple copy print jobs will sequentially feed the paper in a serial manner. The speed of the printer is a function of the speed at which the image can be created, the speed at which the image can be transferred to the paper and the speed of the fuser. As increased output is required, the speed of each of these elements must be increased.

In a monochrome process, only one transfer operation is required. However, in a multipass color process, multiple images must be superimposed on one another on the sheet of paper in a direct transfer system, thus requiring multiple passes of the paper or image carrier through the print engine. In a double transfer system, the image is disposed on an intermediate drum and then the composite image transferred to the paper or image carrier. In a multiple print job on a direct transfer system, this requires each sheet of paper to be printed in a serial manner by passing it through the print engine. For either the monochrome process or the color process, a conventional serial feed print engine has the output thereof defined by the speed of the input device and the speed of the print engine itself.

One technique that has been utilized to increase throughput is a tandem print engine. In a tandem print engine, multiple colors can be disposed on the sheet of paper or the image carrier at different stations that are disposed in serial configuration. In this manner, the speed is the same for one, two, three or four color printing.

SUMMARY

Apparatus and methods are described for printing a multi-page print job in a multiple print engine system. A raster image processor engine receives the print job and parses it into separate pages, which are then disposed in a page buffer. A processor selects pages from the page buffer and outputs them to select ones of a plurality of printers in a predetermined order.

BRIEF DESCRIPTION OF THE DRAWINGS

For a more complete understanding of the present invention and the advantages thereof, reference is now made to the following description taken in conjunction with the accompanying drawings in which:

FIG. 1 illustrates an overall block diagram of the present invention;

FIG. 2 illustrates a more detailed block diagram of the present invention;

DETAILED DESCRIPTION

Figure 3A:
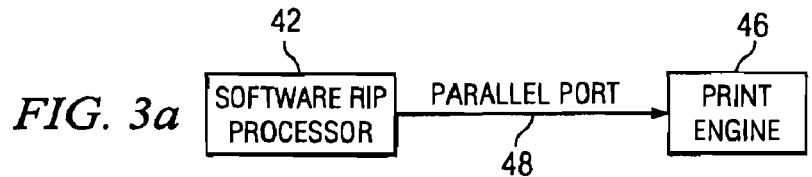
FIGS. 3a, 3b and 3c illustrate three general processing configurations.

Referring now to FIG. 1, there is illustrated a block diagram of the overall operation of the present invention. A plurality of workstations 10 are provided, which comprise general personal computers or other terminals that allow a user to create print jobs. Each of the workstations is networked through a network interface 12, which is a conventional type of general network interface such as an Ethernet® network interface. This allows each workstation 10 to send its print job to a central processor 14, which is operable to process the print jobs in accordance with the system of the present invention and distribute these print jobs to multiple print engines 16.

As will be described below, processor 14 is operable to disassemble the print job, parse the print job into different pages and distribute the parsed pages in a predetermined manner in accordance with the present invention. It should be understood that a print job, although initiated as a series of pages, is sent as a single job to a printer. Typically, printers receive the print job in a conventional manner, which is a string of digits and the printers determine whether the codes are for an end of page command, etc. However, most print operations within a given workstation 10 are designed such that the print job is to be sent to a single printer and, therefore, the codes are all "bundled" in a common string or job. As will be described below, for the pages to be parsed, it is important to first determine the beginning and the end of a print job, then determine what printer to send that distinct and separate page to, in accordance with the system of the present invention.

Referring now to FIG. 2, there is illustrated a more detailed block diagram of the operation of the processor and the parsing operation for distributing the parsed pages to the various print engines 16. The job is received in a serial manner, and is "spooled" in a print spooler 20. This is then passed to a software RIP engine 22 which is operable to essentially decode the print string that is received from print spooler 20. This effectively divides each print job into pages. These pages are then stored in page buffers 24. Each page in the page buffer essentially constitutes a single print job, such that any print job received from workstations 10 will then be parsed into a multiple print job file. For example, if a thirty page document were to be sent, this would be sent as a single print job, which would be encoded as such. Software RIP engine 22 is then operable to divide this into thirty separate print jobs.

Once the pages are stored in page buffer 24, the pages then are sent to an image task manager 26 to determine how to organize the pages. This operates in conjunction with an engine manager 28 to determine which of the print engines 16 the job is to be passed to. To effectively increase the throughput from the engine manager 28, there are provided interface circuits 32 which are referred to as Peripheral Connect Interface (PCI) adaptors. Each print engine 16 has an associated PCI 32. Therefore, engine manager 28 interfaces with PCIs 32 through a parallel bus 36, such that data can be transferred thereto at a fairly high data rate, which is the bus transfer data rate of processor 14. PCIs 32 therefore provide an increased rate of transfer to print engines 16. Print engines 16 then place their output into a separate output bin 40 for each print engine 16.

As will be described below, image task manager 26 is operable to arrange the copies such that they can be placed in output bins 40 in a predetermined order. For example, if there were two print engines, each with a 100 sheet paper supply and four print jobs of 50 copies each were to be sent to the printers by workstation 10, the system of the present invention would parse these print jobs such that the first two print jobs went to the first print engine and the second two print jobs went to the second print engine. If, alternatively, the two print engines with the one hundred sheet paper supplies handled two print jobs, one at 150 sheets and one at 50 sheets, then the first print engine would receive the first 100 sheets from the first print job, and the second print engine would receive the remaining 50 sheets of the first print job and the sheets of the second print job. However, they would be sent to the printer in such a manner that when the paper output trays were unloaded and stacked together, the jobs would be arranged in the appropriate manner. Therefore, even though there are multiple printers, to the user they appear as a virtual single printer. All decision making is made in the processor 14.

Figure 3B:
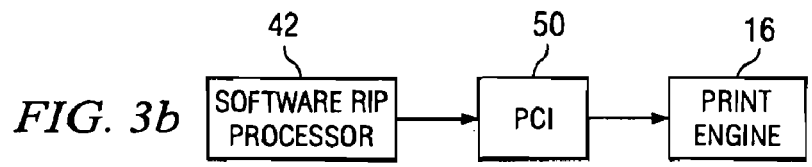
Figure 3C:
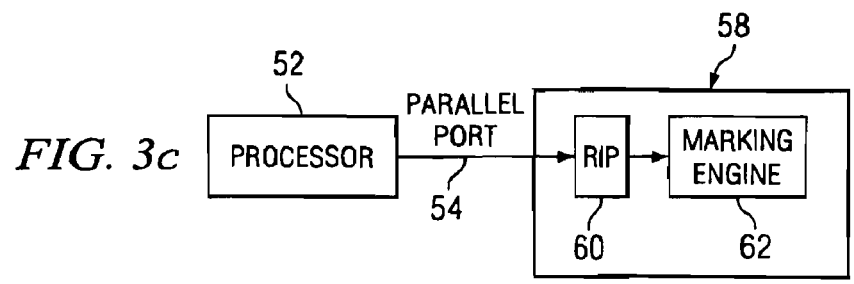

Referring now to FIGS. 3a-3c, there are illustrated the various configurations illustrating the transfer of data between an input and a print engine. In FIG. 3a, there is illustrated a general diagram of a software RIP processor 42, which is operable to generate the data necessary to transfer to a print engine 46. However, this is effected over a conventional parallel port 48. In this configuration, software RIP processor 42 is relatively fast, whereas print engine 46 is relatively slow. Of the time to print, three percent of that time is occupied by the operation of print engine 46, seventy percent is occupied by software RIP processor 42 and twenty-seven percent is occupied by transferring the data from processor 42 to print engine 46. Therefore, the parallel port 48 becomes a key factor in the printing time. In FIG. 3b, software RIP processor 42 is connected to print engine 16 via PCI 50. In this configuration, ninety-five percent of the print time is occupied by software RIP processor 42, three percent by print engine 16 and five percent by PCI 50. Therefore, by reducing the transfer time from processor 42 to print engine 16, an increase in speed has been seen. In FIG. 3c, there is illustrated a fairly conventional system wherein a processor 52 is provided, which can be a conventional PC for assembling the print job in a conventional manner and transferring it via a parallel port 54 to an engine 58, which is a conventional print engine having an internal RIP 60 associated with a marking engine 62. Processor 52 is relatively fast, and it occupies virtually no time. Seventeen percent of the print time is taken passing the data to RIP 60 through parallel port 54, whereas eighty percent of the print time is occupied with RIP 60 and only three percent by marking engine 62.

Figure 4:
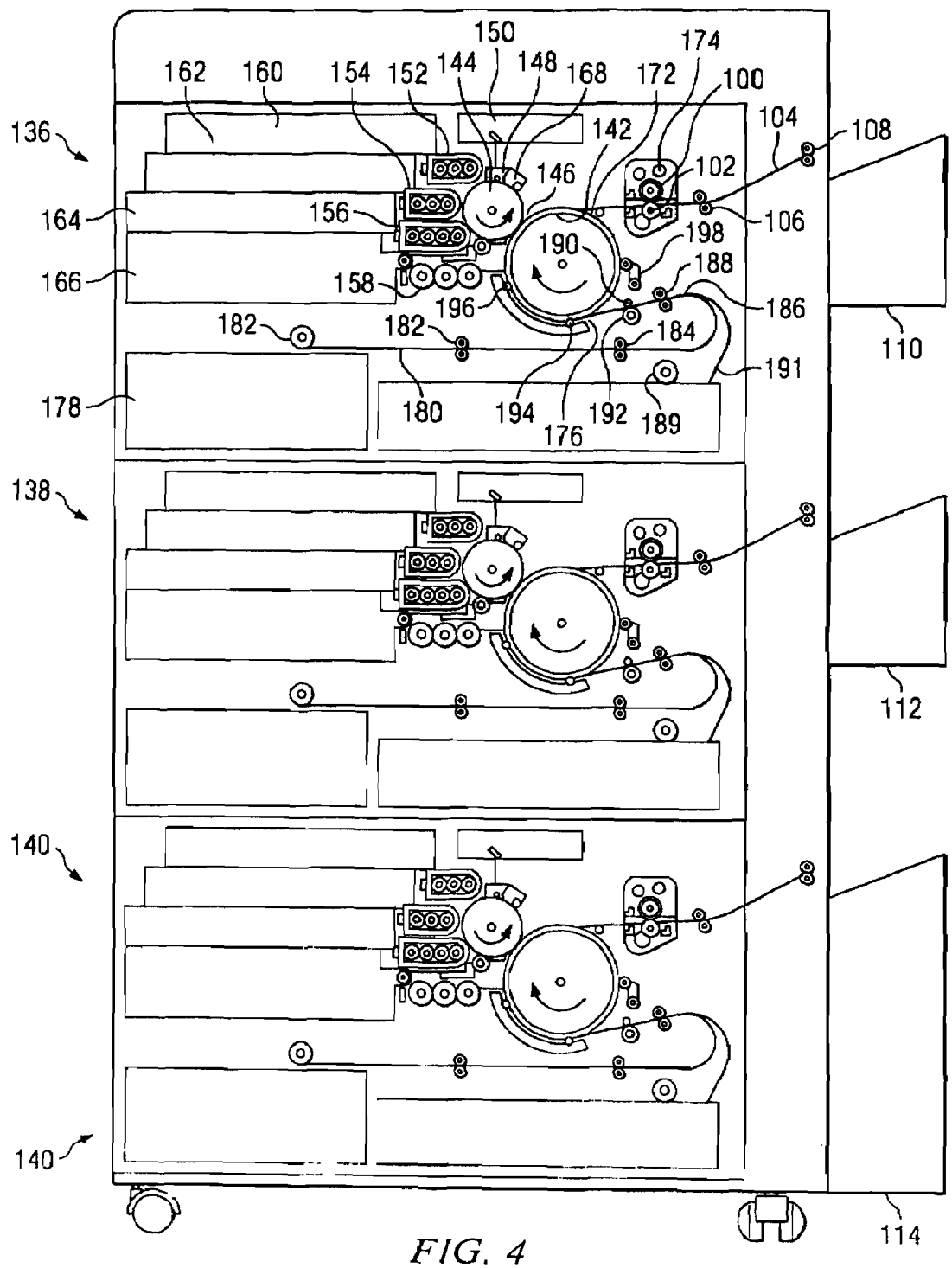
FIG. 4 illustrates a cutaway side view of a three module multiple print engine operated in accordance with the present invention.

Referring now to FIG. 4, there is illustrated a cutaway side view of a three print engine module parallel printer which includes three print engines 136, 138 and 140, all stacked one on top of the other. Each of engines 136-140 is a multi-pass engine and includes a transfer drum 142 and a photoconductor drum 144. Photoconductor drum 144 rotates in a counter-clockwise direction and is pressed against transfer drum 142 to form a nip 146 therebetween. Photoconductor drum 144 is operable to have the surface thereof charged with a corona 148 and then an imaging device 150 is provided for generating a latent image on the charged surface of photoconductor drum 144. The undeveloped latent image is then passed by four developing stations, three color developing stations, 152, 154 and 156 for the colors yellow, magenta and cyan, and a black and white developing station 158. Color developing stations 152, 154 and 156 each have a respective toner cartridge 160, 162 and 164 associated therewith. Black and white developing station 158 has a black and white toner cartridge 166 associated therewith. Although not described below, each of developing stations 152-168 and toner cartridges 160-166 can be removed as individual modules for maintenance thereof.

During the print operation, photoconductor drum 144 is rotated and the surface thereof charged by corona 148. An undeveloped latent image is then formed on the surface of photoconductor drum 144 and then passed under developing stations 150-158. In a multi-pass operation, the latent image is generated and only one color at a time utilized in the developing process for the latent image. This latent image is then passed through nip 146 and transferred to an image carrier, such as paper, which is disposed on the surface of transfer drum 142. Thereafter, the surface of drum 144 is passed under a cleaning station 168, which is operable to remove any excess toner particles which were not passed over to transfer drum 142 during the transfer operation and also discharges the surface of drum 144. The system then begins generation of another latent image, either for a different color on the same sheet of paper or the first color on a different sheet of paper.

In the color operation, multiple passes must be made such that the image carrier, i.e., paper, remains on the surface of transfer drum 142 for the multiple passes. In the first pass, the first latent image is transferred to the surface of the transfer image carrier and then the image carrier maintained on transfer drum 142. The next latent image of the next color is superimposed on the first latent image, it being noted that the registration is important. This registration is provided by the mechanical alignment of the various drums, drive mechanisms, etc. Thereafter, the third color latent image is disposed on the image carrier followed by the fourth color latent image. After the last color latent image is disposed on the image carrier in the color process, a picker mechanism 172 comes down on the surface of transfer drum 142 to lift up the edge of the image carrier or paper. This is then fed to a fuser mechanism 174.

The image carrier is typically comprised of a predetermined weight paper. Transfer drum 142 utilizes electrostatic gripping for the purpose of adhering the paper to the surface of transfer drum 142 for multiple passes. This therefore utilizes some type of charging mechanism for charging the surface of drum 142 at an attachment point 176 where the paper is fed onto the surface of the transfer drum 142. Transfer drum 142 is, in the preferred embodiment, manufactured from a controlled resistivity type material that is disposed over an aluminum support layer which is a hollow cylindrical member. A voltage supply is provided that provides a uniform application of voltage from the voltage supply to the underside of the resilient layer that is disposed over the surface of the aluminum support member. This resilient layer is fabricated from a carbon filled elastomer or material such as butadaiene acrylonitorile, which has a thickness of approximately 3 mm.

Overlying this resilient layer is a controlled resistivity layer which is composed of a thin dielectric layer of material at a thickness of between 50 and 100 microns. This controlled resistivity layer has a non-linear relationship between the discharge (or relaxation) point tying and the applied voltage such that, as the voltage increases, the discharge time changes as a function thereof. The paper is then disposed over the surface of the drum. The construction of this drum is described in U.S. patent application Ser. No. 08/141,273, now U.S. Pat. No. 5,459,560, which is a continuation-in-part of U.S. patent application Ser. No. 07/954,786, now U.S. Pat. No. 5,276,490, which is incorporated herein by reference.

The paper is retrieved from one of two paper supply bins 178 or 180. Paper supply bin 178 contains one type of paper, typically 8½"×11" paper, and paper bin 180 contains another type of paper, typically 8½"×14" paper. Paper bin 178 has the paper stored therein selected by a first gripping roller 182, which is then fed along a paper path 180 into a nip 182 between two rollers and then to a nip 184 between two rollers. This is then fed to a paper path 186 to feed into a nip 188 between two rollers. The paper in nip 188 is then fed into a nip formed between two precurl rollers 190 and 192, which have different durometers to cause the paper to have a curl bias applied thereto in the direction of the curvature of rotation of transfer drum 142. The operation of the pre-curl rollers is described in detail in U.S. Pat. No. 5,398,107. The paper from bin 180 is extracted by a gripping roller 189 and pushed along a paper path 191 to nip 188 and therefrom to pre-curl rollers 190 and 192.

The paper is fed from the nip between pre-curl rollers 190 and 192 at attachment point 176. At attachment point 176, an attachment electrode roller 194 is provided which is operable to operate on a cam mechanism (not shown) to urge roller 194 against the surface of drum 142 to form the attachment nip 176. This is done during the initial attachment of the paper to drum 142. Typically, this attachment electrode roller 194 is connected to ground. The surface of drum 142 is charged to a positive voltage of between 800-1,000 volts. The voltage is disposed on the surface of drum 142 by a positive electrode roller 196 that contacts the surface of drum 142 at a point proximate to photoconductor drum 144. Because the electrode 194 is grounded, the voltage will decrease along the surface thereof until a lower voltage is present at attachment point 176. When the paper reaches transfer nip 146, the portion of the surface of photoconductor drum 144 in nip 146 has a potential thereof reduced to ground such that the charged particles will be attracted from the surface of photoconductor drum 144 to the surface of the paper on drum 142.

For a multiple pass operation, attachment electrode 176 will be pulled outward from the drum and the paper allowed to remain on the drum and go through transfer nip 146 for another pass. When the final pass has been achieved at transfer nip 146, picker 172 is swung down onto the surface of drum 142 to direct the paper on the surface of drum 142 to fuser 174. A discharge electrode 198 is then swung down into contact with drum 142 to provide a discharge operation before the surface of the drum enters nip 176 for the next paper attachment process.

When the paper is fed into fuser 174, it is passed into a nip between rollers 200 and 202, both of which have different durometers. Typically, there is one roller that is formed from a metallic material and one roller that is formed of a soft material. The rollers are oriented with roller 200 having the smaller durometer, such that a reverse bias curl will be applied to the paper that is the opposite direction of the curvature of drum 142. This will remove the curvature added to the paper. One of the rollers 200 is heated such that the transferred image is "fused". The paper is then fed into a paper path 204 by a pair of rollers 206. Paper path 204 is fed a set of output rollers 208, which feed bins 210, 212 and 214 for each of the printers 136, 138 and 140. Again, these are conventional print engines, although the speeds of the print engines may be different.

Figure 5:
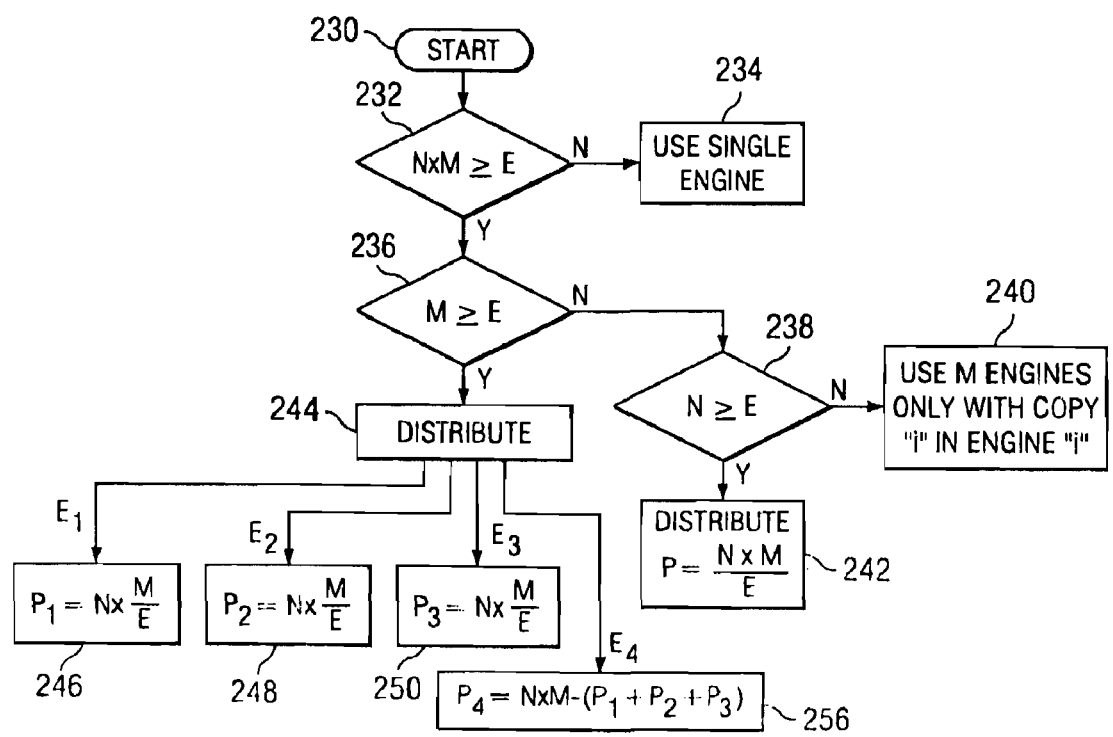
FIG. 5 illustrates a flowchart illustrating the parsing operation.

Referring now to FIG. 5, there is illustrated a flowchart depicting the operation of the present invention. For this description, the following terms are defined:

N=number of pages in a single document
M=copies
E=number of engines
P=number of pages
I=the engine number.

The flowchart is initiated at a start block 230 and then proceeds to a decision block 232. A decision block 232 multiplies the number of pages N by the number of copies M and determines whether this number if greater than or equal to the number of engines. If not, then the program flows along a "N" path to a function block 234 to utilize only a single engine for the print job. However, if the number is greater than the number of engines, then the program proceeds along the "Y" path to a decision block 236 to determine the number of copies M is greater than the number of engines E. If not, the program flows along a path "N" to a decision block 238 to determine if the number of pages in a single document "N" is greater than or equal to the number of engines. If not, the program will flow along a "N" path to a function block 240 to utilize the only M engines with the ith copy in the ith engine. Therefore, if there are ten engines and only five copies, then the fifth copy of a job will be in this the fifth engine. If, however, the number of copies in a single document is greater than the number of engines, then the program will flow along a "Y" path to a function block 242 wherein the copies will be distributed in accordance with the equation:

$$P = \frac{N \times M}{E} \quad (1)$$

If it was determined in the decision block 236 that the number of copies M was greater than the number of engines with the number of copies times the number of pages in a single document also being greater than the number of engines, then the program flows along the "Y" path from decision block 236 to a decision block 244 to distribute copies. These are distributed in accordance with the algorithms illustrated in FIG. 5 with respect to four of the engines E1, E2, E3 and E4. E1, E2 and E3 are also associated with function blocks 246, 248 and 250, each operating in accordance with equation (1) associated with function block 242. However, E4 will flow to a function block 256 wherein the distribution will be as follows:

$$P = N \times M - (P_1 + P_2 + P_3) \quad (2)$$

Figure 6:
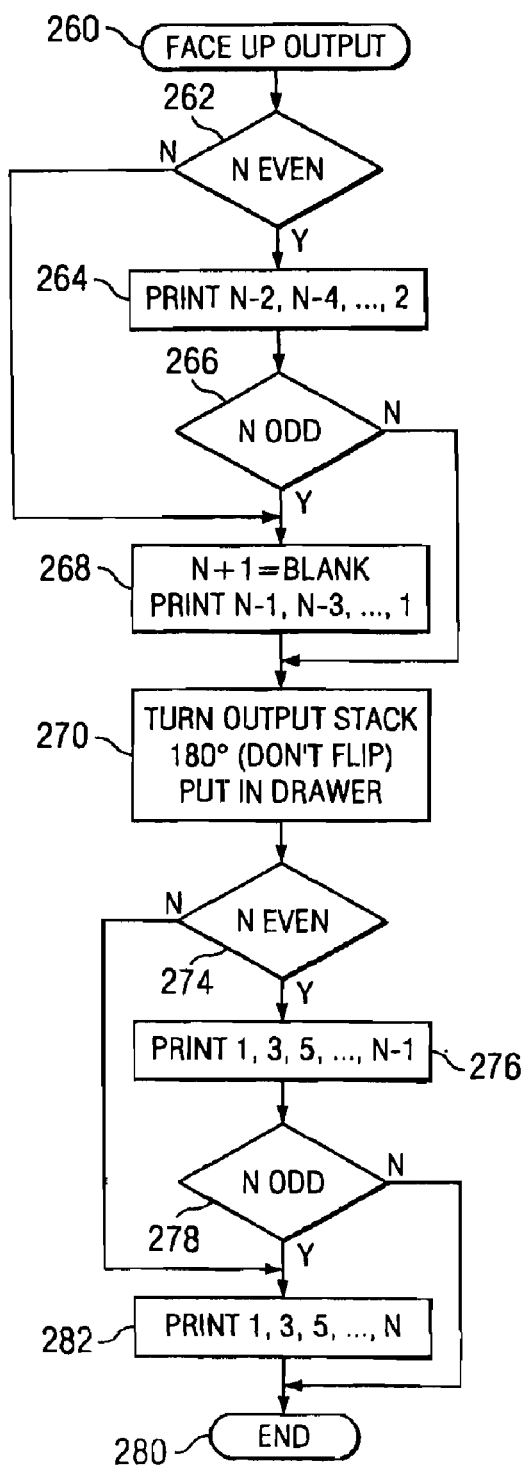
FIG. 6 illustrates a flowchart for the duplex operation for a face up output.

Referring now to FIG. 6, there is illustrated a flowchart depicting the operation for a duplex print job. In the flowchart of FIG. 6, a face up output is considered which is initiated at a block 260. The function block then flows to a decision block 262 to determine if the value of N is even. If so, the program flows to a function block 264 to print pages N−2, N−4, . . . , 2. The program then flows to a decision block 266, which determines whether the value of N is odd. However, if N was odd at decision block 266, the program would flow along the "N" path to the output of the decision block 266 and then to a function block 268 to print N+1 blank pages and then print pages N−1, N−3, . . . , 1. The flowchart would then flow to a function block 270. It is noted that if N is even at decision block 266, the program would flow to the function block 270. Function block 270 is a function block wherein a user manually turns the output stack 180° without flipping the stack and then puts it back in the drawer of the printer from which it came. The program then flows to a decision block 274 to determine if the value of N is even, and if so, to the function block 276 along the "Y" path to print pages 1, 3, 5, . . . , N–1, and then to a decision block 278 to determine if the value of N is odd. The program at this point will flow along the "N" path to a N block 280. However, if the value of N is determined to be odd at decision block 274, the program will flow through the output of decision block 278 and to the input of a function block 282 which will print pages 1, 3, 5, . . . , N.

Figure 7:
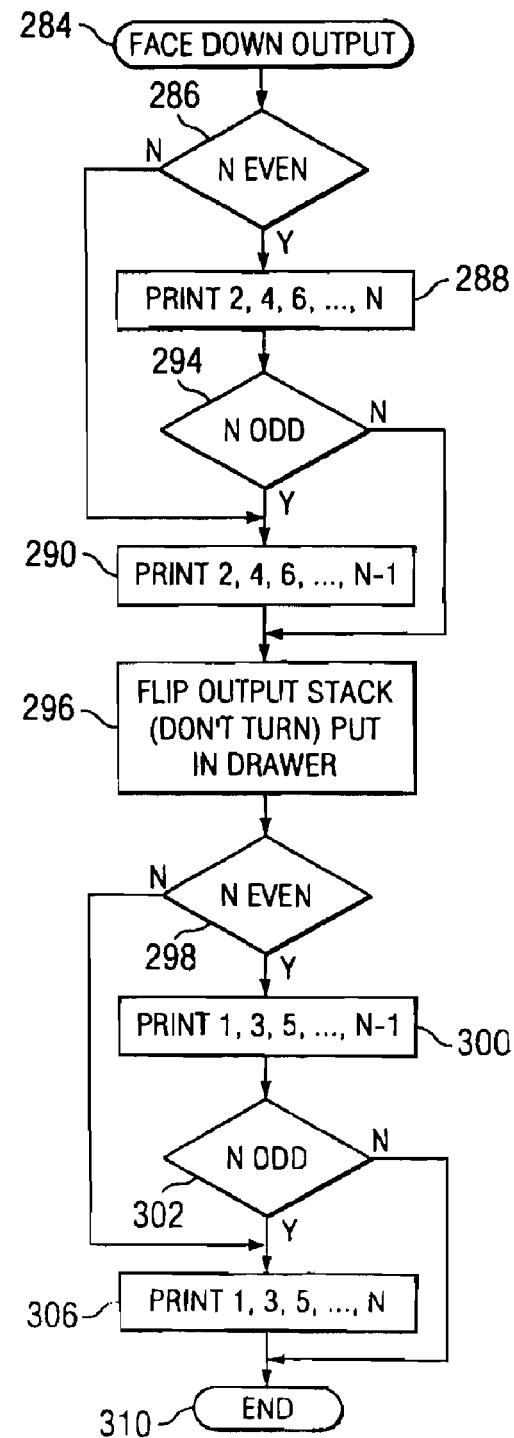
FIG. 7 illustrates a flowchart for the duplex operation for a face down output.

Referring now to FIG. 7, there is illustrated a flowchart depicting the duplex operation with a face down output, which is initiated at a block 284 and then proceeds to a decision block 286 to determine if the value of N is even. If so, the program then flows to a function block 288 along the "Y" path to print pages 2, 4, 6, . . . , N. If it was determined that the value of N is odd, the program would flow along an "N" path to a function block 290 to print pages 2, 4, 6, . . . N–1. The program at 288 would flow to a decision block 294, which determines if N is odd and, if not, flows along a "N" path to the output of function block 290. The output of function block 290 flows through a function block 296, as well as the output along the "N" path of decision block 294. Decision block 296 indicates the manual operation wherein the user flips the output stack without turning it 180° and then inputs it back into the drawer of the printer from which it was obtained. The program will then flow to a decision block 298 to determine if the value of N is even. If so, the program flows along a "Y" path to a function block 300 to print pages 1, 3, 5, . . . , N–1 and then to the input of a decision block 302. If the value of N is odd, the program flows along the "N" path from decision block 298 to the output of decision block 302 and to a function block 306 to print pages 1, 3, 5, . . . , N. The output of the decision block 302 along the "Y" path also flows to the function block 306 when N is even, and the flowchart flows along the "N" path to an "END" block 310, this being the path from the function block 306.

In summary, there has been provided a multiple print engine configuration wherein multiple jobs can be configured as a single print job, transferred to a central distribution processor which parses the print jobs into single pages and then determines how to pass them to multiple print engines such that, when output therefrom are such that when a user stacks them up from the output bin the order in which the printers are arranged, or in any type of predetermined order, the pages will be in a sequential manner as the print jobs were received.

Although the preferred embodiment has been described in detail, it should be understood that various changes, substitutions and alterations can be made therein without departing from the spirit and scope of the invention as defined by the appended claims.

The invention claimed is:

1. A multiple print engine system for printing a print job comprising a plurality of pages, the system comprising:
    a raster image processor adapted to receive the print job and generate a raster image processed ("RIPed") print job;
    a parsing device adapted to parse the RIPed print job to RIPed pages;
    a page buffer for storing the RIPed pages;
    a plurality of printers, each comprising an associated output bin; and
    a processor for selectively distributing after RIPing the RIPed print job by outputting select RIPed pages for printing by select ones of the printers in a predetermined order for output as sheets in the associated output bin.

2. The multiple print engine system of claim 1, wherein the pages in the print job are disposed in an order, and the predetermined order is the order of the pages in the print job.

3. The multiple print engine of claim 1, wherein the page buffer comprises a single page buffer for storing all of the RIPed pages.

4. The multiple print engine of claim 1, wherein the RIPed pages comprise bit-mapped images of the pages in the print job.

5. The multiple print engine of claim 1, wherein the raster image processor comprises a single raster image processor.

6. The multiple print engine of claim 5, wherein the raster image processor operates in a central processing unit and is a software-based raster image processor.

7. A multiple print engine system for printing a plurality of print jobs, each print job comprising a plurality of pages, the system comprising:
    a spooler adapted to receive the print jobs in parallel and serially output the spooled print jobs;
    a raster image processing engine adapted to receive the print jobs from the spooler and generate a corresponding raster image processed ("RIPed") print job;
    a parsing device adapted to parse the RIPed print jobs to RIPed pages;
    a page buffer for storing the RIPed pages;
    a plurality of printers, each comprising an associated output bin; and
    a processor for selectively distributing after RIPing the RIPed print job by outputting select RIPed pages for printing by select ones of the printers in a predetermined order for output as sheets in the associated output bin.

8. The multiple print engine system of claim 7, wherein the pages in the print job are disposed in an order, and the predetermined order is the order of the pages in the print job.

9. The multiple print engine of claim 7, wherein the page buffer comprises a single page buffer for storing all of the RIPed pages.

10. The multiple print engine of claim 7, wherein the RIPed pages comprise bit-mapped images of the pages in the print job.

11. The multiple print engine of claim 7, wherein the raster image processor comprises a single raster image processor.

12. The multiple print engine of claim 11, wherein the raster image processor operates in a central processing unit and is a software-based raster image processor.

13. A method for printing a print job comprising a plurality of pages to a plurality of printers, each printer comprising an associated output bin, the method comprising:
    raster image processing the print job to generate a raster image processed ("RIPed") print job;
    parsing the RIPed print job to RIPed pages;
    storing the RIPed pages in a page buffer; and
    selectively distributing after RIPing the RIPed print job by outputting select RIPed pages for printing by select ones of the printers in a predetermined order for output as sheets in the associated output bin.

14. The method of claim 13, wherein the pages in the print job are disposed in an order, and the predetermined order is the order of the pages in the print job.

15. The method of claim 13, wherein the page buffer comprises a single page buffer for storing all of the RIPed pages.

16. The method of claim 13, wherein the RIPed pages comprise a bit-mapped images of the pages in the print job.

17. The method of claim 13, wherein raster image processing comprises using a software-based raster image processor to generate the RIPed print job.

* * * * *